(12) United States Patent
Drouet et al.

(10) Patent No.: US 12,326,241 B2
(45) Date of Patent: Jun. 10, 2025

(54) LIGHT-EMITTING DIODE ASSEMBLY FOR VEHICLES

(71) Applicant: SAINT-GOBAIN GLASS FRANCE, Courbevoie (FR)

(72) Inventors: Xavier Drouet, Marly-la-Ville (FR); Laurent Silvestrini, Bussy (FR); Claire Davis, Compiegne (FR); Buyin Yu, Compiegne (FR); Christophe Kleo, Attichy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/557,713

(22) PCT Filed: Apr. 21, 2022

(86) PCT No.: PCT/FR2022/050746
§ 371 (c)(1),
(2) Date: Oct. 27, 2023

(87) PCT Pub. No.: WO2022/229542
PCT Pub. Date: Nov. 3, 2022

(65) Prior Publication Data
US 2024/0219006 A1 Jul. 4, 2024

(30) Foreign Application Priority Data
Apr. 30, 2021 (FR) ....................... 2104531

(51) Int. Cl.
*B32B 17/10* (2006.01)
*F21V 19/00* (2006.01)
(Continued)

(52) U.S. Cl.
CPC ...... *F21V 19/004* (2013.01); *B32B 17/10036* (2013.01); *B32B 17/10293* (2013.01);
(Continued)

(58) Field of Classification Search
CPC ........ B32B 17/10036; B32B 17/10005; B32B 17/10; B60Q 3/00; F21V 19/004
See application file for complete search history.

(56) References Cited

U.S. PATENT DOCUMENTS

| 11,331,885 B2 * | 5/2022 | Hennion ........... B32B 17/10036 |
| 2015/0016132 A1 * | 1/2015 | Verrat-Debailleul ....................... B32B 17/10036 362/509 |

FOREIGN PATENT DOCUMENTS

| CN | 103842210 A | 6/2014 |
| EP | 2 597 365 A2 | 5/2013 |

(Continued)

OTHER PUBLICATIONS

International Search Report as issued in International Patent Application No. PCT/FR2022/050746, dated Sep. 19, 2022.

*Primary Examiner* — Ismael Negron
(74) *Attorney, Agent, or Firm* — Pillsbury Winthrop Shaw Pittman LLP

(57) ABSTRACT

An assembly includes a glazing with an interior glass sheet having a through hole, an exterior glass sheet, and at least one intermediate plastic layer; a light-emitting diode module with a light emitting diode having an illuminating part, and a base; a support plate fixed to a face of the interior glass sheet opposite the at least one intermediate plastic layer, the support plate including several lugs extending away from the interior glass sheet and a spring element. The illuminating part is positioned in the through hole, with the base retained by the lugs, and pressed against the glazing by the spring elements.

19 Claims, 6 Drawing Sheets

(51) Int. Cl.
*F21V 19/04*       (2006.01)
*B60Q 3/208*       (2017.01)
*F21Y 113/00*      (2016.01)
*F21Y 115/10*      (2016.01)

(52) U.S. Cl.
CPC .. *B32B 17/10541* (2013.01); *B32B 17/10807*
(2013.01); *F21V 19/04* (2013.01); *B32B
2605/00* (2013.01); *B60Q 3/208* (2017.02);
*F21Y 2113/00* (2013.01); *F21Y 2115/10*
(2016.08)

(56)        References Cited

FOREIGN PATENT DOCUMENTS

| FR | 2 895 781 A1 | 7/2007 | |
|---|---|---|---|
| WO | WO-2010091742 A1 * | 8/2010 | ....... B32B 17/10036 |
| WO | WO 2011/092420 A2 | 8/2011 | |
| WO | WO 2013/017790 A1 | 2/2013 | |
| WO | WO 2018/178591 A1 | 10/2018 | |

* cited by examiner

[Fig.1]
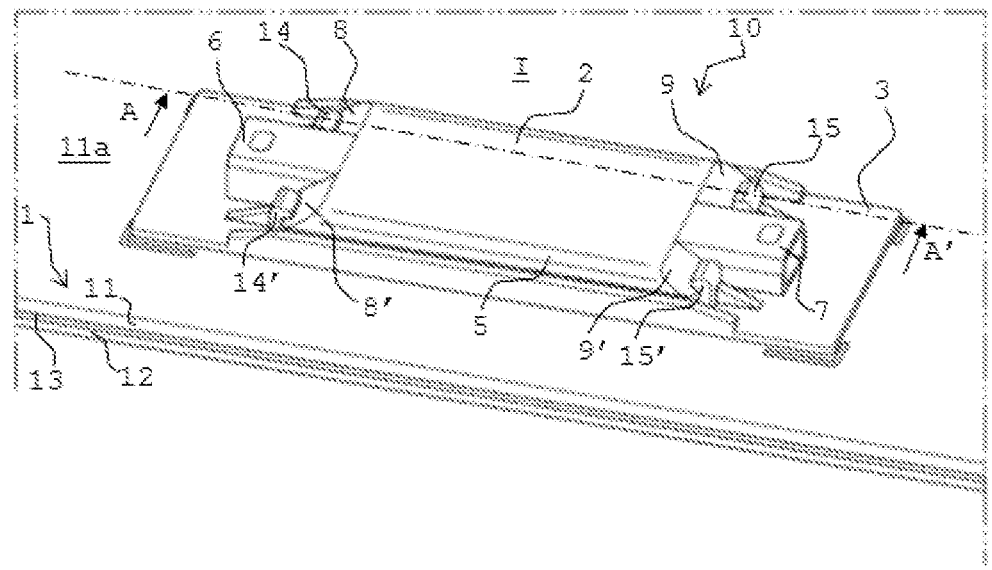
[Fig.2]
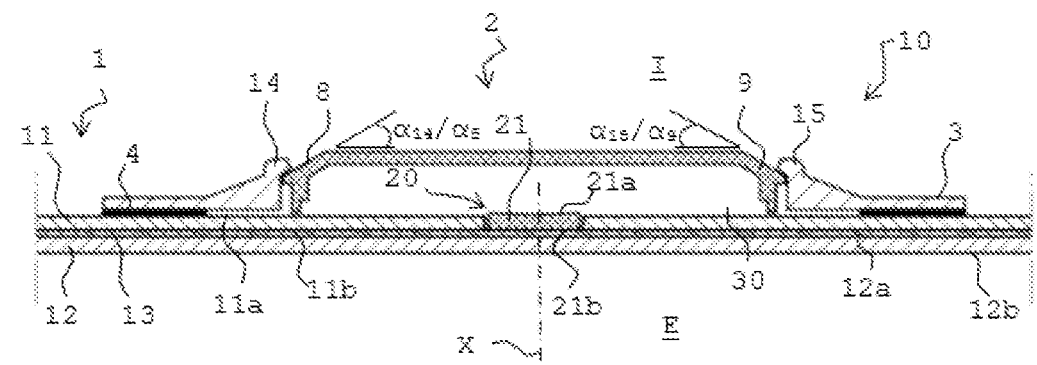
[Fig.3]
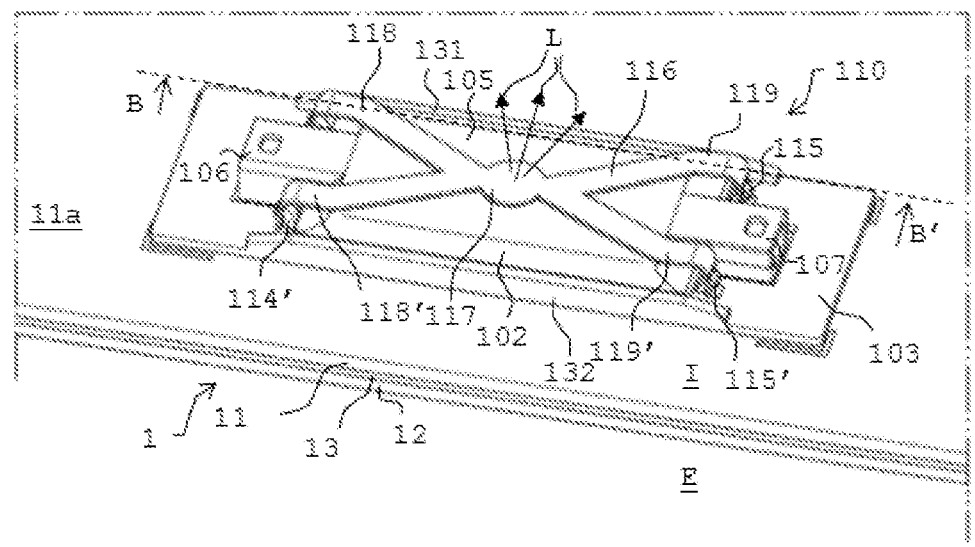

[Fig.4]
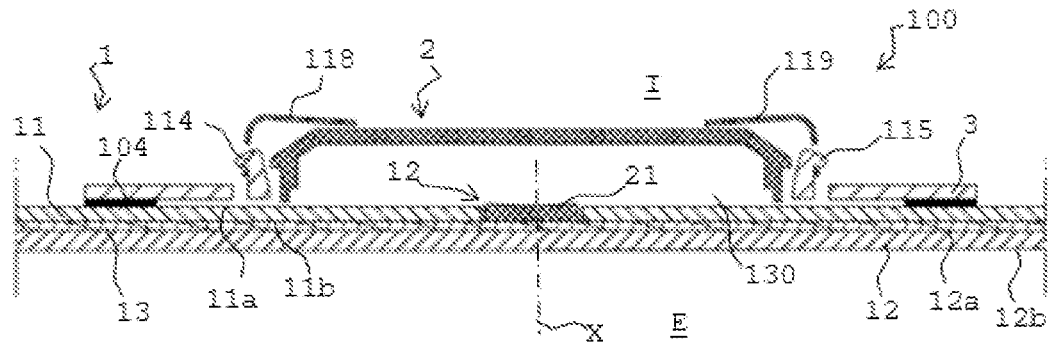
[Fig.5]
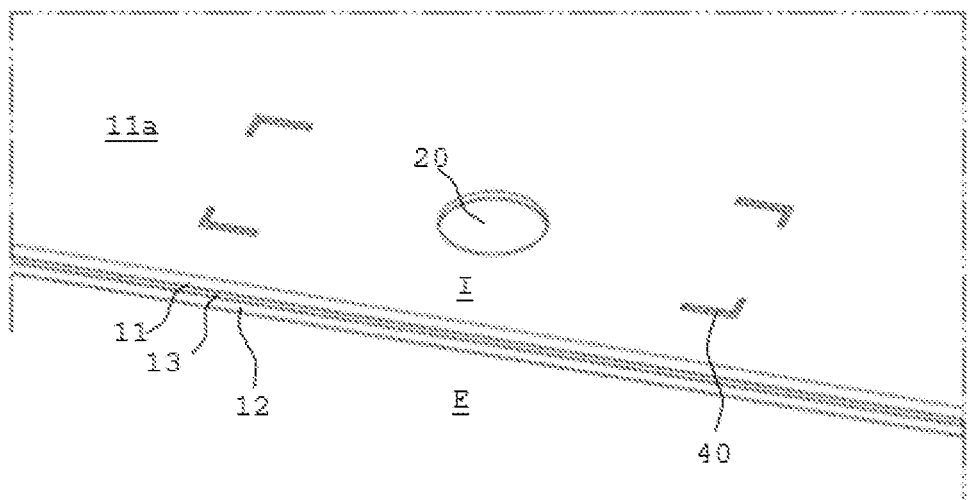
[Fig.6]
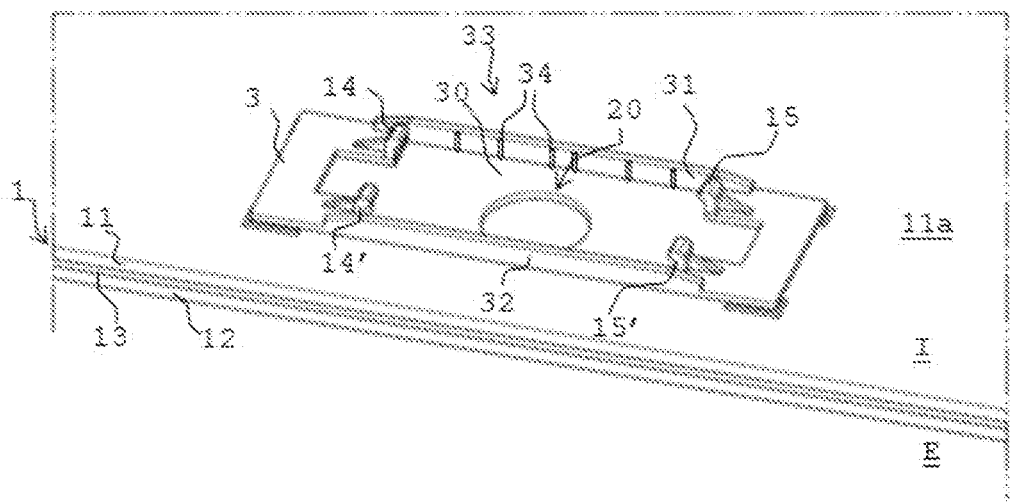

[Fig.7]
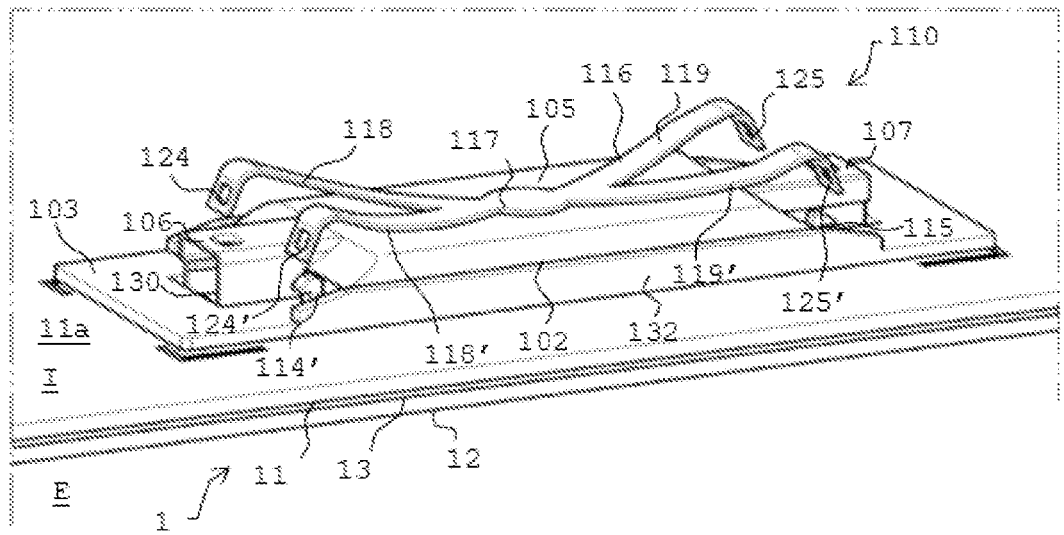
[Fig. 8]
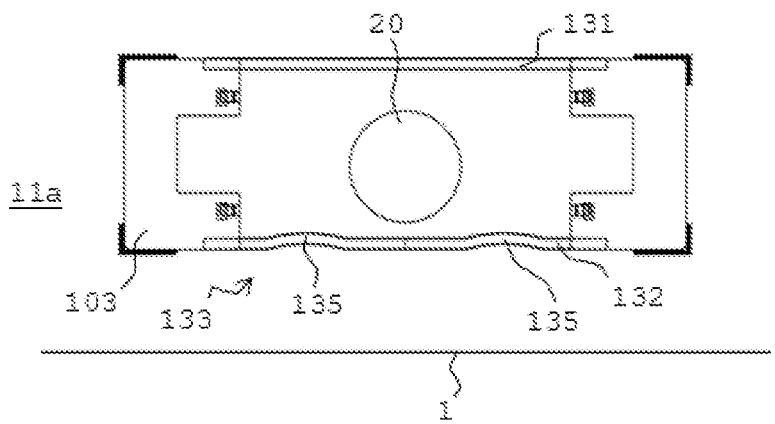
[Fig. 9]
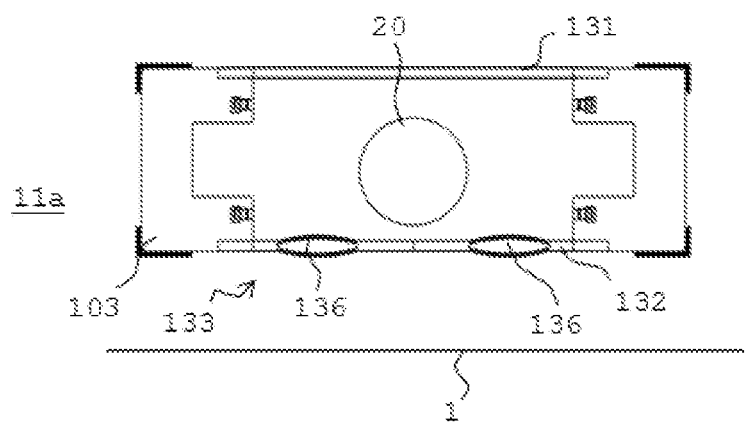

[Fig. 10a]
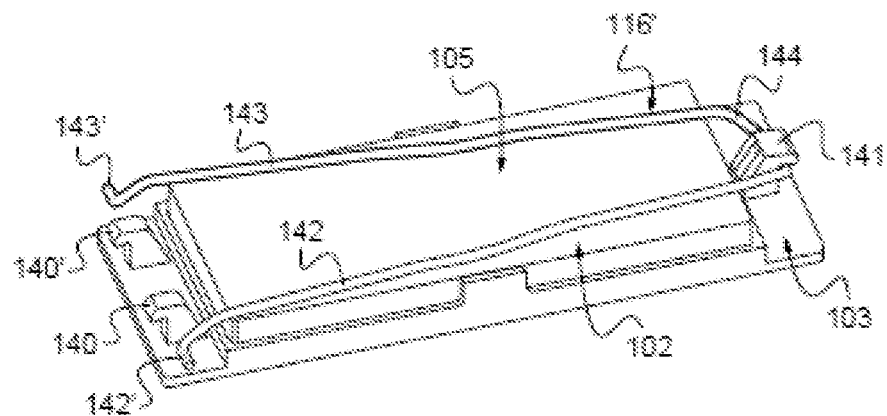
[Fig. 10b]
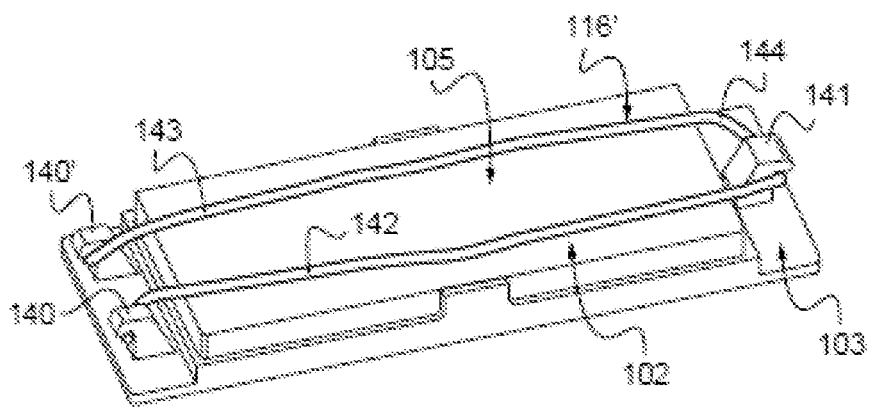
[Fig. 11a]
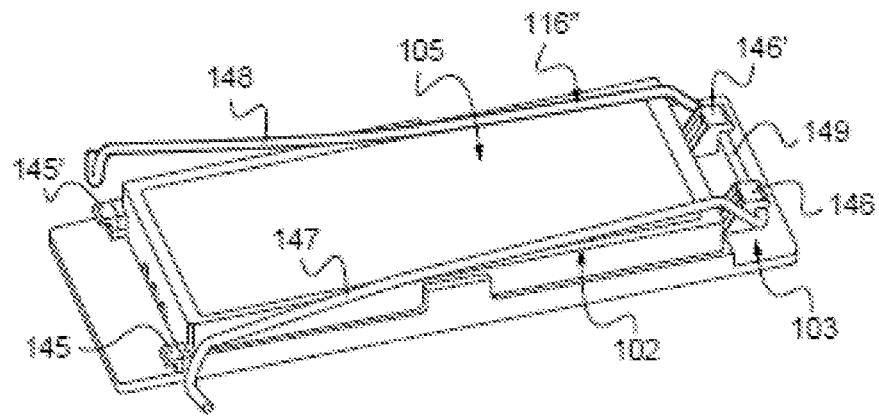

[Fig. 11b]
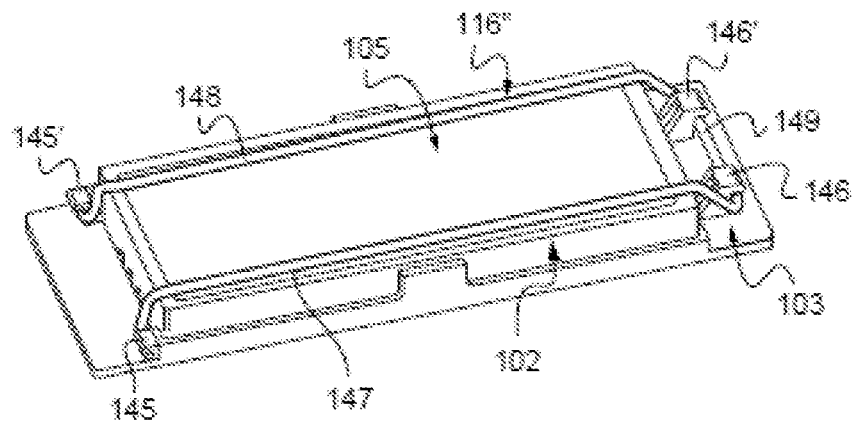
[Fig. 12]
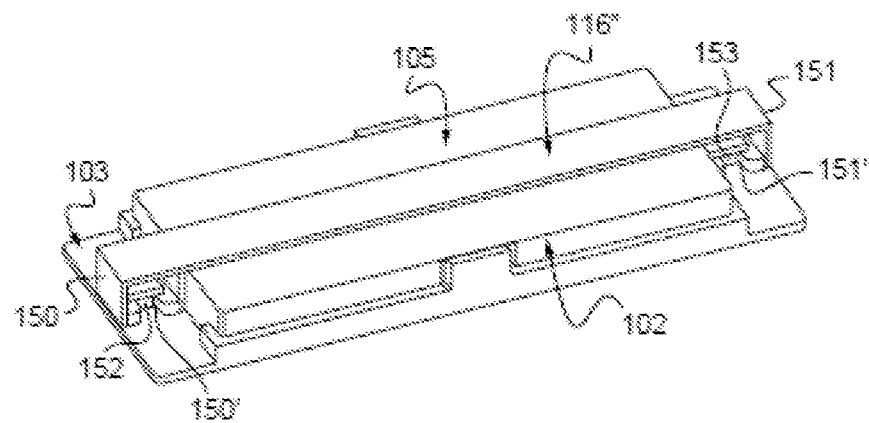
[Fig. 13]
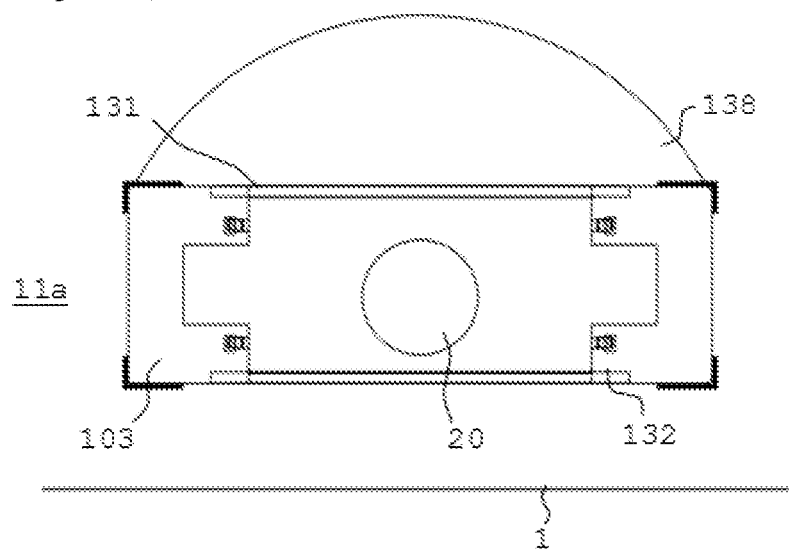

[Fig. 14a]
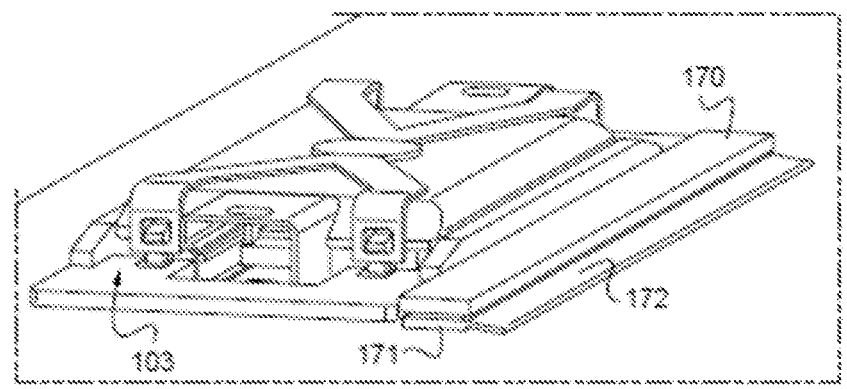
[Fig. 14b]
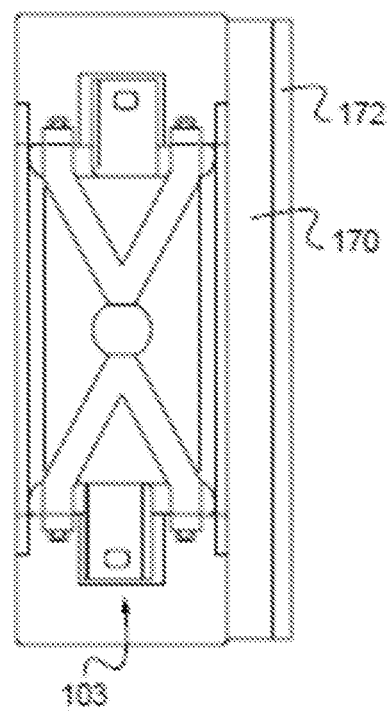

LIGHT-EMITTING DIODE ASSEMBLY FOR VEHICLES

CROSS-REFERENCE TO RELATED APPLICATIONS

This application is the U.S. National Stage of PCT/FR2022/050746, filed Apr. 21, 2022, which in turn claims priority to French patent application number 2104531 filed Apr. 30, 2021. The content of these applications are incorporated herein by reference in their entireties BACKGROUND

FIELD

The invention relates to light-emitting diode modules for glazing, particularly for motor vehicles.

DESCRIPTION OF RELATED ART

Glazing comprising one or more light-emitting diodes is known from the prior art. For example, international patent application WO 2018/178591, in particular without its FIGS. 6B and 6D, discloses an assembly for a motor vehicle comprising a light-emitting diode module and laminated glazing comprising an interior glass sheet, an exterior glass sheet, and an interlayer sheet of plastic material located between said two sheets of glass, said glazing having an exterior face intended to be oriented towards an exterior space, an edge and an inner face intended to be oriented towards an interior space, said interior glass sheet comprising a through cylindrical opening and having a central axis and said module comprising a light-emitting diode and comprising an illuminating part arranged in said cylindrical opening.

This solution is open to improvement because, upon utilizing the vehicle, the fixing of the module can lose its reliability and the positioning relative to the center of the thickness of the interior glass sheet may vary. However, a small variation of this positioning is likely to generate a high loss of amount of light finally transmitted in the thickness of the interior glass sheet. A deviation of the position of the light-emitting part of the module from its nominal position with respect to the interior glass sheet can thus occur.

SUMMARY

The object of the invention is to overcome the shortcomings of the prior art by proposing a light-emitting diode module that is simple to assemble and disassemble, while being extremely reliable over time and during use of the vehicle, as well as a simplified and more reliable method of assembling such a module with glazing.

The present invention is thus based on a solution wherein the light-emitting diode module is permanently under the effect of a clipping force in order to guarantee that an illuminating part (light-emitting part) of this module is permanently correctly positioned relative to the interior glass sheet situated about.

To do this, the invention thus relates, in its broadest sense, to an assembly for a vehicle, particularly a motor vehicle, comprising a light-emitting diode module and laminated glazing comprising an interior glass sheet, an exterior glass sheet, and at least one interlayer sheet of plastic material located between said two sheets of glass, said glazing having an exterior face intended to be oriented towards an exterior space, an edge and an inner face intended to be oriented towards an interior space, said interior glass sheet comprising a through opening (i.e. crossing said interior glass sheet over its entire thickness) and said module comprising a light-emitting diode and comprising a base and an illuminating part that is arranged in said opening.

This assembly is remarkable in that it comprises a support plate, fixed to an inner face of said interior glass sheet, said support plate comprising several lugs extending from said support plate in the direction of said interior space in order to retain said module and to apply said base against an inner face of said interior glass sheet, preferably all about said opening, and/or to apply said illuminating part against a bottom of said opening by spring effect, preferably against the entire bottom of said opening, each application being carried out indirectly by simultaneously pressing a spring element on said module (102) and under said lugs.

Thus the illuminating part of the module is correctly positioned with respect to the edge face of said interior glass sheet in said opening and correctly maintained in this position.

Said opening that is in said interior glass sheet is "through" in the sense that it crosses said interior glass sheet over its entire thickness; it is not an opening that would be made along an edge of said interior glass sheet, but a tube that is preferably of constant cross-section, e.g. circular or oval. Preferably, said opening does not pass through said exterior glass sheet over its entire thickness; said exterior glass sheet is preferably integral with respect to the exterior of said opening.

Preferably, said illuminating part comprises a face opposite an inner face of said exterior glass sheet (without necessarily being in contact with it), said face being located in the middle of the thickness of the inner glass with a tolerance of ±0.5 mm. Advantageously, said tolerance is ±0.1 mm, or better still ±0.05 mm.

Said support plate preferably has a hole being present all about the periphery of said opening and preferably has a generally rectangular shape. Advantageously, said support plate is made of plastic.

Said lugs can be two in number, positioned diametrically opposite, in order to allow distribution of the retaining forces of said module by said support plate.

Said lugs are, preferably, four in number, the periphery of said opening being divided into four quarters, said lugs are each arranged in a single peripheral quarter of said opening, in order to enable an adequate distribution of the retaining forces of said module by said support plate.

In a variant, said lugs are preferably oriented two by two with their bosses facing each other; they are, preferably, arranged two by two along the length of the rectangular support plate in order to obtain a higher retention effect along this length.

In another variant, said lugs are oriented two by two with their bosses opposite one another; they are preferably arranged two by two along the length of the rectangular support plate in order to obtain a higher retention effect along this length.

Said application of said base against an inner face of said interior glass sheet by spring effect and/or said application of said illuminating part against a bottom of said opening by spring effect is (or are) carried out, preferably, by support under said lugs, in the direction of said exterior space.

In some embodiments, said module has a first pair of inclined faces and a second pair of inclined faces, a boss of the lugs resting under each inclined face, towards said exterior space.

Preferably, said inclined faces have an angle of between 15° and 45°, preferably between 25° and 35°.

In some embodiments, said module is linked to said support plate by means of a spring element comprising a central zone resting on a base of the module, a first pair of branches and a second pair of branches, said first pair of branches secured under, respectively, a first pair of lugs and said second pair of branches secured under, respectively, a second pair of lugs. Said branches preferably extending along the length of said generally rectangular shape of the support plate, in order to apply a stronger spring effect.

Regardless of the embodiment, said support plate preferably comprises side guide walls. At least one side guide wall preferably has at least one lateral support in order to allow lateral support of said module towards the other side wall or for centering purposes if two facing side walls have at least one lateral support. A lateral support can be in the form of a solid rib, a solid boss or even a curved spring blades.

Regardless of the embodiment, said assembly for a vehicle may additionally comprise means for blocking light leaking inwardly to the vehicle.

In a variant embodiment, said means for blocking light leakage inwardly to the interior of the vehicle are a diffusion-barrier plate present adjacent to said support plate, against said inner face of the interior glass sheet. Said diffusion-barrier plate is, preferably, integral with said support plate because it is thus easier to manage its proper positioning; however, it may be attached to said support plate or independent of the latter. It prevents the emission of raking light near the module, inwardly.

Preferably, said module and said support plate have a clearance, said inclined faces presenting an angle so that said clearance is negative, preferably between 0.3 mm and 0.5 mm.

In another variant embodiment, said means for blocking light leaking into the interior of the vehicle comprise a first diffusion shielding plate taking the form of a blade present adjacent to the support plate as well as a second diffusion-barrier plate fixed against the first diffusion-barrier plate, so as to fill a gap located between said first diffusion-barrier plate and the inner face of the interior glass sheet, said second diffusion-barrier plate further comprising a lip protruding from said first diffusion-barrier plate and configured to bear on said inner face.

The invention also relates to a support plate for the assembly for vehicles, particularly motor vehicles, according to the invention.

This support plate comprises several lugs extending from said support plate in the direction of said interior space in order to make it possible to retain said module and to apply said base against an inner face of said interior glass sheet, preferably all about said opening, and/or to apply said illuminating part against a bottom of said opening by spring effect, preferably against the entire bottom of said opening.

The invention further relates to a method for assembling an assembly according to the invention, said method comprising:
- a step of applying an adhesive material to said support plate and/or to said inner face of the interior glass sheet;
- a step of depositing said support plate on said inner face;
- a step of assembling said module to said support plate.

These steps are, preferably, successive.

Preferably, a step of marking said inner face of said interior glass sheet is performed before the step of applying an adhesive material.

In a first embodiment, the assembly step is performed by clipping said module directly to said support plate.

In a second embodiment, the assembly step is carried out by means of a spring element.

BRIEF DESCRIPTION OF THE SEVERAL VIEWS OF THE DRAWINGS

Described below, by way of non-limiting examples, will be several embodiments of the present invention referring to the appended figures in which:

FIG. 1 schematically represents an isometric view of a part of the glazing comprising a light-emitting diode module;

FIG. 2 schematically illustrates a cross sectional view along A-A' of the part of the glazing shown in FIG. 1;

FIG. 3 schematically illustrates an isometric view of part of a glazing comprising a light-emitting diode module according to one embodiment of the invention;

FIG. 4 schematically shows a cross sectional view along B-B' of the part of the glazing shown in FIG. 3;

FIG. 5 schematically represents an isometric view of a marking step according to a method of assembling a light-emitting diode module with a glazing according to the invention;

FIG. 6 schematically illustrates an isometric view of a bonding step of a support on a glazing;

FIG. 7 schematically represents an isometric view of an assembly step according to the invention;

FIG. 8 schematically shows an isometric top view of a variant of the support plate of the invention, with lateral supports in the form of solid bosses;

FIG. 9 schematically shows an isometric top view of a variant of the support plate of the invention, with lateral supports in the form of curved spring blades;

FIG. 10a schematically represents a step of partial cooperation between a spring element and the support plate in an alternative embodiment of the invention;

FIG. 10b schematically represents a step of finalized cooperation between the spring element and the support plate in the alternative embodiment of FIG. 10a;

FIG. 11a schematically represents a step of partial cooperation between a spring element and the support plate in another alternative embodiment of the invention;

FIG. 11b schematically represents a step of finalized cooperation between the spring element and the support plate in the alternative embodiment of FIG. 11a;

FIG. 12 schematically represents a step of cooperation between a spring element and the support plate in yet another alternative embodiment of the invention;

FIG. 13 schematically represents a variant embodiment of the invention wherein means for blocking light leakage inwardly to the interior of the vehicle are used, according to a front view from above of the glazing;

FIG. 14a schematically represents another variant according to the invention of the means for blocking light leakage inwardly to the interior of the vehicle, according to an isometric top view of the glazing;

FIG. 14b is a front top view of the glazing of the alternative embodiment of FIG. 14a.

DETAILED DESCRIPTION

In the following description, the term "centripetal" corresponds to an orientation towards the center of the considered device, or element, and the term "centrifugal" corresponds to an orientation that tends to move away from the center of the considered device, or element.

Referring to [FIG. 1] and [FIG. 3], in the context of the invention there is schematically illustrated, in isometric view, a glazing 1 comprising a module 2 with light-emitting diode(s) according to a first embodiment of the present invention or comprising a module 102 with light-emitting diode(s) according to a second embodiment of the present invention.

The glazing 1 is laminated and has an interior glass sheet 11 and an exterior glass sheet 12, as well as an interlayer sheet of plastic material 13 placed between them. The interlayer of plastic material 13 can be, for example, flexible polyurethane, a plasticizer-free thermoplastic such as ethylene/vinyl acetate copolymer (EVA) or polyvinyl butyral (PVB). The interlayer sheet of plastic material 13 has, for example, a thickness of between 0.2 mm and 1.1 mm, or even between 0.38 mm and 0.76 mm. The interior glass sheet 11 has an inner face 11a, oriented inwardly of glazing 1, and an interlayer face 11b (not visible in [FIG. 1] and [FIG. 3]), oriented outwardly of glazing 1. The exterior glass sheet 12 has an interlayer face 12a (not visible in [FIG. 1]), oriented inwardly of glazing 1, and an external face 12b (not visible in [FIG. 1] and [FIG. 3]), oriented outwardly of glazing 1. The inner face 11a is the inner face of glazing 1 and the external face 12b is the external face of glazing 1. The plastic interlayer sheet 13 makes it possible to bond the interior glass sheet 11 to the exterior glass sheet 12.

A glazing is said to be "laminated" in the sense that there is no gaseous space or empty space between the at least three sheets that constitute it in the exterior-interior transverse direction. Although this is not illustrated, the glazing may in particular comprise two plastic interlayer sheets.

Referring to [FIG. 2], [FIG. 4] and [FIG. 5], there is schematically shown a cross sectional view of glazing 1 along a sectional plane along A-A' of [FIG. 1] for [FIG. 2] and according to B-B' of [FIG. 3] for [FIG. 4], these sections being perpendicular to the inner face 11a of the interior glass sheet 11 and a perspective view in [FIG. 5] of glazing 1 without the modules 2, 102, nor the support plates 3, 103.

The interior glass sheet 11 comprises an opening 20 that is herein cylindrical and executed over its entire thickness with a constant circular section over its entire depth and having a central axis X. The module 2, 102 comprises an illuminating part 21, also having a central axis that is coaxial with and coincides with the central axis X, and located in the opening 20. This illuminating part 20 has a first face 21a, having an orientation towards the interior space I, and a second face 21b, having an orientation towards the exterior space E. The module 2, 102 comprises a light-emitting diode (not visible) that can be located in the illuminating part 21. This illuminating part has an emitting surface, which emits light in the lateral direction, opposite the edge face (or "edge") of the nearest interior glass sheet 11, as illustrated by the arrows L in [FIG. 3]; In [FIG. 8], [FIG. 9] and [FIG. 13], the light is emitted upwards.

The glazing 1 also comprises a support plate 3, 103 fixed by bonding to the first face 11a of the interior glass sheet 11 by virtue of an adhesive material 4 (layer of glue or double-sided adhesive tape). The support plate 3, 103 has a generally rectangular shape that is present all about the opening 20, at a distance from this opening. The support plate 3, 103 additionally has a hole 30, 130, over the entire thickness of the support plate. This hole may be cylindrical and have a central axis that is coaxial with and coincides with the central axis X; the diameter of this cylindrical hole is then greater than the diameter of the illuminating part 20. This hole can be parallelepipedal, as seen in [FIG. 6] and [FIG. 7].

The support plate 3, 103 may have guide walls 31, 32, 131, 132 to guide the positioning of the module 2, 102.

At least one side guide wall 31, 132 preferably has at least one lateral support 33, 133 in order to enable lateral support of the module 2 towards the other side wall, respectively 32, 131.

Regardless of the embodiment, a diffusion-barrier plate may be present adjacent to said support plate, against said inner face of the interior glass sheet. Said diffusion-barrier plate is, preferably, integral with said support plate because it is thus easier to manage its proper positioning; however, it can be attached to said support plate or be independent of the latter. It prevents the emission of raking light near the module, inwardly.

The adhesive material 4 is in the form of a layer having a thickness varying between 0.2 mm and 2.0 mm and preferably between 0.8 and 1.2 mm, particularly 1.0 mm and it is, preferably, present all about the opening 20, at a distance from this opening 20. The adhesive material 4 can be a UV crosslinking glue, for example based on acrylate, or else based on polyurethane or a mixture of acrylate and epoxy (SBT).

In the context of the first embodiment, referring to [FIG. 1], [FIG. 2] and [FIG. 6], the module 2 has a longitudinal central axis and comprises a base 5, a first protuberance 6, arranged on one side of the base 5, and a second protrusion 7, arranged on the other side of the base 5. The base 5 and the first and second protrusions 6, 7 are arranged along the central longitudinal axis of the module 2. The base 5 comprises a first pair of inclined faces 8, 8', arranged on the side of the first protuberance 6, and a second pair of inclined faces 9, 9', arranged on the side of the second protuberance 7. The support plate 3 comprises a first pair of lugs 14, 14' arranged on the side of the first protuberance 6, and a second pair of lugs 15, 15', arranged on the side of the second protuberance 7.

It is shown, in [FIG. 2], a first lug 14 of the first pair of lugs and a first lug 15 of the second pair of lugs. The second lug 14' (not visible) of the first pair of lugs is identical to the first lug 14 and is oriented in the same direction. The second lug 15' (not visible) of the second pair of lugs is identical to the first lug 15 and is oriented in the same direction. The first lugs 14, 15 each respectively comprise a single boss, and these bosses are oriented in opposite directions, one in the direction of the other. The second lugs 14', 15' each respectively comprise a single boss, and these bosses are oriented in opposite directions, one in the direction of the other.

It is shown in this [FIG. 2] a first inclined face 8 of the first pair of inclined faces and a first inclined face 9 of the second pair of inclined faces. The second inclined face 8' (not visible) of the first pair of inclined faces is identical to the first inclined face 8. The second inclined face 9' (not visible) of the second pair of inclined faces is identical to the first inclined face 9. The boss of lug 14 comprises an internal inclination with an angle $\alpha_{14}$ and the boss of the lug 15 comprises an internal inclination with an angle $\alpha_{15}$. The first inclined face 8 of the first pair of inclined faces has an angle as and the first inclined face 9 of the second pair of inclined faces has an angle $\alpha_9$. Preferably, angle $\alpha_{14}$ of the internal inclination of the boss of lug 14 and angle as of the first inclined face 8 of the first pair of inclined faces are substantially equal (or are identical) and angle $\alpha_{15}$ of the internal inclination of the boss of lug 14 and angle as of the first inclined face 9 of the second pair of inclined faces are substantially equal (or are identical). Preferably, in absolute terms, angle $\alpha_{14}$ of the internal inclination of the boss of lug 14, angle as of the first inclined face 8 of the first pair of inclined faces, angle $\alpha_{15}$ of the internal inclination of the boss of lug 15 and angle as of the first inclined face 9 of the second pair of inclined faces are substantially equal (or are identical).

The first lug 14 of the first pair of lugs and the first lug 15 of the second pair of lugs can be configured so as to create a negative clearance of between 0.1 mm and 0.5 mm with module 2. In this way, the contact between the second face 21b of the illuminating part 21 and the interlayer sheet of plastic material 13 (or a plastic pellet positioned in its place in the outer bottom of the opening 20) is ensured in order to correctly transmit light from the light emitting diode.

The light emission, located between faces 21a and 21 b, is aligned with the middle of the thickness of the interior glass sheet 11 with a tolerance of ±0.5 mm in order to enable suitable diffusion of the light coming from the light-emitting diode through the edge face of the interior glass sheet. Advantageously, the location tolerance of the central axis between faces 21a and 21b is ±0.1 mm in order to obtain an optimal coupling of the light emitted by the light-emitting diode to the interior glass sheet.

Indeed, the first lugs 14, 15 press respectively, via the internal inclination of their bosses, on the first inclined face 8 of the first pair of inclined faces and on the first inclined face 9 of the second pair of inclined faces. In the same way, the second lugs 14', 15' respectively support, via the internal inclination of their bosses, the second inclined face 8' of the first pair of inclined faces and the second inclined face 9' of the second pair of inclined faces.

By virtue of the invention, the thickness of the adhesive material 4 has no effect on the contact between the second face 21b and the interlayer sheet of plastic material 13 (or the contact with a plastic pellet positioned in its place in the outer bottom of the opening 20). Indeed, the first and second pairs of lugs 14, 14', 15, 15' as well as the first and second pairs of inclined faces 8, 8', 9, 9' are configured in such a way as to produce a force sufficient to flatten module 2 on the interlayer sheet of plastic material 13, even if the thickness of the adhesive material 4 varies.

[FIG. 6] illustrates lateral supports 33 in the form of solid ridges 34, extending along their length in the exterior-interior direction.

In the context of the second embodiment, referring to [FIG. 3], [FIG. 4] and [FIG. 7], module 102 has a longitudinal central axis and comprises a base 105, a first protuberance 106, arranged on one side of the base 105, and a second protrusion 107, arranged on the other side of the base 105. The base 105 and the first and second protrusions 106, 107 are arranged along the longitudinal central axis of module 102. The support plate 103 comprises a first pair of lugs 114, 114', arranged on the side of the first protuberance 106, and a second pair of lugs 115, 115', arranged on the side of the second protuberance 107.

The glazing 1 also comprises a spring element 116, independent of module 102, or even attached to this module 102, and to the support plate 103 and making it possible to link the module 102 to the support plate 103. The spring element 116 comprises a central zone 117, herein in the form of a disc, resting on the base 105 of module 102, a first pair of branches 118, 118', arranged on the side of the first protuberance 106 and connected to the zone 117, and a second pair of branches 119, 119', arranged on the side of the second protuberance 107 and also connected to the central zone 117.

The central zone 117 has a central axis that is coaxial with and coincides with the central axis X. The branches 118, 118', 119, 119' extend from the central zone 117 in centrifugal directions with respect to the center of this central zone and parallel to the inner face 11a of the interior glass sheet. The branches 118, 118', 119, 119' as well as the central zone 117 are flat, in order to reduce bulkiness. The branches 118, 118', 119, 119' are curved at 90° at their ends opposite the central zone and in the direction of the inner face 11a. These ends each respectively comprise an perforation 124, 124', 125, 125' (visible in [FIG. 7]).

The base 105 comprises a first pair of inclined faces 108, 108', arranged on the side of the first protuberance 106, and a second pair of inclined faces 109, 109' arranged on the side of the second protuberance 107.

Referring to [FIG. 4], there is shown a first lug 114 of the first pair of lugs and a first lug 115 of the second pair of lugs. The second lug 114' of the first pair of lugs is identical to the first lug 114 and is oriented in the same direction. The second lug 115' of the second pair of lugs is identical to the first lug 115 and is oriented in the same direction. The first lugs 114, 115 comprise, respectively, a single boss, and these bosses are oriented in opposite directions, one opposite the other. The second lugs 114', 115' comprise, respectively, a single boss, and these bosses are oriented in opposite directions, one opposite the other.

The boss of the first lug 114 is located in the perforation 124 of the first branch 118 and the boss of the first lug 115 is located in the opening 125 of the first branch 119. The boss of the second lug 114' is located in the perforation 124' of the second branch 118' and the boss of the second lug 115' is located in the opening 125' of the second branch 119'.

Thus, spring element 116 presses firmly on the module 102 so that the contact between the second face 21b of the illuminating part 21 and the interlayer sheet of plastic material 13 (or a plastic pellet positioned in its place in the outer bottom of the opening 20) is ensured in order to correctly transmit the light coming from the light-emitting diode. The spring element 116 has a thickness of between 0.2 mm and 1.0 mm and can be made of steel of type 1.4310 AlSi 301.

The second face 21b is located in the middle of the thickness of the exterior glass sheet 11 with a tolerance of ±0.5 mm in order to enable suitable diffusion of the light coming from the light-emitting diode. Advantageously, the location tolerance of the second face 21b is ±0.1 mm in order to obtain optimum transmission of the light emitted by the light-emitting diode. By virtue of the invention, the thickness of the adhesive material 4, 104 has no effect on the contact between the second face 21b and the interlayer sheet of plastic material 13. Indeed, the application of the illuminating part 21 against a bottom of said opening 20 by spring effect is configured so as to produce a sufficient force to press module 2, 102 on the interlayer sheet of plastic material 13 (or a plastic pellet plastic positioned in its place in the outer bottom of the opening 20), even if the thickness of the adhesive material 4, 104 varies.

The bosses of the lugs 14, 14', 15, 15', 114, 114', 115, 115' are located at a distance of a few millimeters from the general plane of the support plate 3, 103 in order to give them a slight flexibility with respect to this support plate. To increase this flexibility, it is possible to provide for the support plate to be partially perforated at the junction with the lugs, as seen in [FIG. 4].

The second glass sheet 12 can be opaque, transparent, tinted, made from inorganic or organic glass with various functionalities (solar control coating). The first glass sheet 11 is transparent (TL>85% or better TL>90% or even TL>91%) and can be monolithic, i.e. comprised of a single sheet of material, or be composite, i.e. comprised of several sheets of material between which is inserted at least one layer of adherent material, in the case of laminated glazing. The sheet(s) of material may be made of mineral glass, having for example undergone annealing or tempering, or of organic glass, particularly of plastic material such as polyvinyl butyral, PC, PMMA, PU, resin ionomer or polyolefin.

It should be noted that the second embodiment has been described up to the present referring only to [FIG. 3], [FIG. 4] and [FIG. 7]. Nevertheless, nothing excludes considering that variant embodiments of said second embodiment wherein the number of lugs of the support plate 103 and/or the shape of the spring element 116 and/or the cooperation between the element spring 116 and support plate 103 may differ.

For this purpose, [FIG. 10a], [FIG. 10b], [FIG. 11a], [FIG. 11b] and [FIG. 12] schematically illustrate three variant embodiments of said second mode. These alternatives are represented in [FIG. 10a], [FIG. 10b], [FIG. 11a], [FIG. 11b] and [FIG. 12] in isometric view and in a simplified manner (ie the glazing 1 is not shown here).

More particularly, [FIG. 10a], [FIG. 10b] illustrate a first variant of the second embodiment. [FIG. 10a] (and/or [FIG. 10b]) illustrates a partial cooperation step (a finalized cooperation step) between a spring element 116' and the support plate 103. In this first variant, the support plate 103 comprises:

two lugs 140, 140' arranged, along the longitudinal axis of the module 102, on a first side of the base 105, a lug 141 arranged, along the longitudinal axis of the module 102, on the side opposite to said first side of base 105.

Said lugs 140, 140', 141 are shaped, in terms of the boss (shape, orientation), substantially identically to lugs 114, 114', 115.

As illustrated by [FIG. 10a], the spring element 116' comprises two branches 142, 143 that meet at a connecting part 144 so that the spring element 116' substantially takes the shape of a V in the rest state.

As illustrated by [FIG. 10b], the connecting part 144 is configured so as to cooperate with the lug 141 by becoming secured under the boss of the latter. Furthermore, the branches 142, 143 comprise respective ends 142', 143', curved outwardly of the support plate 103 and configured to cooperate with the lugs 140, 140' respectively by becoming secured under the bosses of these (the cooperation of the ends 142', 143' with the lugs 140, 140' is carried out by deformation of the spring element 116, more particularly by deformation of the branches 142, 143).

[FIG. 11a], [FIG. 11b] illustrate a second variant of the second embodiment. [FIG. 11a] (and/or [FIG. 11b]) illustrates a partial cooperation step (a finalized cooperation step) between a spring element 116" and the support plate 103. In this second variant, the support plate 103 comprises:

two lugs 145, 145' arranged, along the longitudinal axis of the module 102, on a first side of the base 105, two lugs 146, 146' arranged, along the longitudinal axis of the module 102, on the side opposite to said first side of base 105.

The spring element 116" comprises two branches 147, 148 that meet at a connecting part 149 so that the spring element 116" substantially takes the shape of a V in the rest state.

The cooperation between the spring element 116" and the support plate 103 takes place, in this second variant, in a manner similar to that of the first variant of [FIG. 10a], [FIG. 10b], with the difference that the connecting part 149 is herein sufficiently extended to be secured under the two lugs 146, 146'.

[FIG. 12] illustrates a third variant of the second embodiment.

In this third variant, use is made of a spring element 116''' substantially taking the form of a bar comprising two ends 150, 151. The support plate 103, for its part, comprises two lugs 152, 153 arranged, along the longitudinal axis of the module 102, on either side of the base 105.

Each of said ends 150, 151 have a substantially parallelepipedal shape, and comprise a face arranged opposite the support plate 103 and are provided with an opening 150', 151' configured to cooperate with one of said lugs 152, 153 (the cooperation is carried out by clipping a lug into an opening).

[FIG. 8] illustrates lateral supports 133 in the form of solid bosses 135

[FIG. 9] illustrates lateral supports 133 in the form of curved spring blades 136.

As already mentioned before, the illuminating part 21 has an emitting surface, which emits light in the lateral direction, opposite the edge face (or "edge") of the closest interior glass sheet 11, as illustrated by the arrows L in [FIG. 3]. This light emitted according to said arrows L can be divided into three parts:

a first part that is injected into the glass and is guided into the glass so that it remains there. This first part corresponds to the "useful" light in the sense that it is the light that performs the lighting function of the assembly, a second part of the light that is injected into the glass in a non-raking manner, at angles of incidence configured so that the light in question does not remain in the glass. This second part of light can therefore either exit directly inwardly of the vehicle, or be directed towards the interlayer sheet 13 then towards the exterior glass sheet 12 to finally bounce off the outer surface of the latter and thus emerge inwardly of the vehicle a little further from the illuminating part 21. In any event, this second part of light is likely to generate an optical defect called a "halo", a third part of the light that is not injected into the glass but that exits in the immediate vicinity of the surface of the glass on the inside of the vehicle. This raking light is directly visible from the illuminating part 21 but also illuminates any roughness on the surface of the glass (such as dust, for example).

It therefore emerges from the foregoing that the light emitted by the illuminating part 21 can be the source of optical/visual defects (halo, highlighting of roughness).

Also, regardless of the embodiment of the assembly for vehicles proposed by the invention, it can also be envisaged to remedy the aforementioned shortcomings by providing said assembly with means for blocking light leaking inwardly to the vehicle (i.e. means configured to block, at least partially, said second and third portions of light emitted according to the arrows L of [FIG. 3].

According to a particular embodiment of said blocking means of light leakage, a diffusion-barrier plate 138 may be present adjacent to support plate 3, 103, against said inner face 11a of interior glass sheet 11. By "adjacent to the support plate", reference is here made to the lateral edge of the support plate 103 through which light can be emitted according to the arrows L of [FIG. 3]. [FIG. 13] illustrates such a diffusion-barrier plate 138 for the second embodiment. It is integral with the support plate 103. In this example of [FIG. 13], said diffusion-barrier plate 138 is shaped substantially according to a half-disk and contributes particularly to masking the halo effect that occurs in the glazing.

According to another exemplary embodiment, illustrated in no way limiting by [FIG. 14a] and [FIG. 14b] in the context of said second embodiment, and matching respectively an isometric top view and to a front top view of glazing 1, said blocking means of light leakage comprise a first diffusion-barrier plate 170 taking the form of a rectangular blade that can either be made in one piece with the support plate 103, or be attached and fixed to said support plate 103 so as to form an extension thereof (the fixation can be carried out according to any technique known to those skilled in the art). Similarly to what has been described in the context of [FIG. 13], said first diffusion-barrier plate 170 is present adjacent to the support plate 103 at the level of the lateral edge through which light can be emitted according to the arrows L of [FIG. 3].

Moreover, in this other exemplary embodiment, said blocking means of light leakage also comprise a second diffusion-barrier plate 171 fixed, for example by bonding (for example by means of an adhesive tape), against a face of the first diffusion-barrier plate 170, so as to fill a gap located between said first diffusion-barrier plate 170 and the inner face 11a of the interior glass sheet 11. Said second diffusion-barrier plate 171 further comprises a lip 172 extending from the upper face of said second plate 171 (i.e. from the face positioned facing the first diffusion-barrier plate 170), projecting laterally with respect to said first diffusion-barrier plate 171 and configured to rest on the inner face 11a of the interior glass sheet 11. Said lip 172 comes for example integral with the second plate 171.

Said second diffusion-barrier plate 171 is advantageously made of plastic material so as to be able to be deformed and thus achieve the pressing on the glazing 1. Such a configuration (first and second diffusion-barrier plates 170, 171) proves to be particularly advantageous in that it makes it possible particularly to mask, at least partially, the halo effect, but also to absorb said third part of light as mentioned above so as to avoid the illumination of roughness on the surface of the glass.

The insertion of one or more diodes in a glazing 1 enables, for example, the following signaling functionalities:
ambient lighting of the interior of the vehicle
bright display of decorative patterns
display of indicator lights intended for the driver of the vehicle or for passengers (example: alarm indicator for engine temperature in the automobile windshield, indicator of operation of the electric defrosting system, windows, etc.),
display of indicator lights intended for people outside the vehicle (example: operating indicator for vehicle alarm in the side windows),
light display on vehicle glazings (e.g. flashing light display on emergency vehicles, safety display with low power consumption indicating the presence of a vehicle in danger). The module may comprise a control signal receiver diode, particularly in the infrared, to remotely control the diodes.

The diode can be a simple semiconductor chip, for example of a size of the order of a hundred μm. The diode can, however, comprise a protective envelope (temporary or not) to protect the chip during handling or to improve the compatibility between the materials of the chip and other materials. The diode can be encapsulated, i.e. comprising a semiconductor chip and an envelope, for example in epoxy type resin or in PMMA, encapsulating the chip and whose functions are multiple (protection against oxidation and humidity, scattering or focusing element, wavelength conversion).

The diode can be selected, particularly from at least one of the following light-emitting diodes:
a diode with electrical contacts on opposite faces of the chip or on the same face of the chip,
an emitting diode parallel to the (faces of) electrical contacts,
a diode whose main direction of emission is perpendicular or oblique with respect to the emitting face of the chip,
a diode having two main directions of emission oblique with respect to the emitting face of the chip giving the shape of a bat wing, the two directions being, for example, centered on angles between 20° and 40° and between −20° and −40° with half-angles at the top of the order of 10° to 20°,
a diode having (only) two main directions of emission oblique with respect to the emitting surface of the diode, centered for example on angles between 60° and 85° and between −60° and −85° with half-angles at the top of the order of 10° to 30°,
a diode arranged for guiding in the edge face or for emitting directly through one or the faces, or through the opening of the interior glass sheet (diode then called inverted).

The emission diagram of a source can be Lambertian. Typically, a collimated diode has a half-angle at the top that can go down to 2 or 3°. The module can thus incorporate all known functionalities in the field of glazing. Among the functionalities added to the glazing, mention may be made of: a hydrophobic/oleophobic, hydrophilic/oleophilic, antifouling photocatalytic, stack reflecting thermal radiation (solar control) or infrared (low-emissivity), or anti-reflective layer. The structure can advantageously comprise a mineral diffusing layer associated with one of the main faces that is a luminous face (by extraction of the radiation). The diffusing layer may be composed of elements containing particles and a binder, the binder making it possible to agglomerate the particles together. The particles can be metallic or metallic oxides, the particle size can be between 50 nm and 1 μm, preferably the binder can be mineral for heat resistance. The diffusing layer may consist of particles agglomerated in a binder, said particles having an average diameter of between 0.3 and 2 microns, said binder being in a proportion comprising between 10 and 40% by volume and the particles forming aggregates with dimensions between 0.5 and 5 microns. The particles can be selected from semi-transparent particles and preferably mineral particles such as oxides, nitrides or carbides. The particles will preferably be selected from oxides of silica, alumina, zirconia, titanium, cerium, or a mixture of at least two of these oxides. For example, a diffusing mineral layer of approximately 10 μm is selected.

The invention also relates to a method of assembling a light-emitting diode module 2, 102 with a glazing 1, as disclosed previously. During a first step E1, an adhesive material 4, 104 is applied to the inner face 11a of the interior glass sheet 11. Alternatively, the adhesive material 4, 104 is applied to the support plate 3, 103 or to both.

During a second step E2, the support plate 3, 103 is deposited on the adhesive material 4, 104. Alternatively, during a step carried out before the first step E1, a marking 40 is made, as illustrated in [FIG. 5], on the interior glass sheet 11, in order to facilitate the removal of the support plate 3, 103 on this interior glass sheet 11.

During a third step E3, the light-emitting diode module 2, 102 is assembled on the support plate 3, 103 by direct clipping, as for the first embodiment illustrated in [FIG. 1], [FIG. 2] and [FIG. 6], or by indirect clipping by means of a spring element 116, as for the second embodiment illustrated in [FIG. 3], [FIG. 4] and [FIG. 7].

The assembly of the light-emitting diode module 2, 102 with the support plate 3, 103 can also be achieved with a pressure screw, an elastic spacer made of a flexible material such as ethylene-propylene-diene monomer, a thermoplastic elastomer or a silicone.

The invention claimed is:

1. An assembly for vehicles, the assembly comprising:
  a light emitting module comprising:
    an illuminating part, and a base;
  a laminated glazing comprising:
    an interior glass sheet comprising a through opening,
    an exterior glass sheet,
    and at least one interlayer sheet of plastic material located between said interior and exterior glass sheets,
  said laminated glazing having an external face configured to be oriented towards an exterior space of the vehicle, an edge and an inner face configured to be oriented towards an interior space of the vehicle;
  a support plate provided on a face of said interior glass sheet opposite the at least one interlayer sheet of plastic material, said support plate comprising a plurality of lugs extending from said support plate in a direction away from the interior glass sheet; and
  a spring element coupled to the lugs,
  wherein the illuminating part of the light diode module is received in the through opening of the interior glass sheet, the lugs of the support plate engaging the spring element, with the spring element pressing the light emitting module against the laminated glazing.

2. The assembly according to claim 1, wherein said plurality of lugs include four lugs around a periphery of said through opening.

3. The assembly according to claim 1, wherein each of said plurality of lugs includes a boss, and are arranged in pairs oriented facing each other.

4. The assembly according to claim 1, wherein each of said plurality of lugs includes a boss, and are arranged in pairs oriented opposite each other.

5. The assembly according to claim 1, wherein said base is pressed against an inner face of said interior glass sheet by the spring element pressing under said lugs, in a direction substantially towards the inner glass sheet.

6. The assembly according to claim 1, wherein said light-emitting diode module further comprises a first pair of inclined faces and a second pair of inclined faces, each of said plurality of lugs including a boss resting under each inclined face in direction substantially towards the inner glass sheet.

7. The assembly according to claim 1, said plurality of lugs comprising first and second pairs of lugs; and said spring element comprises a central zone resting on said base of said light emitting module, a first pair of branches being secured under a respective one of said first pair of lugs, and a second pair of branches being secured under a respective one of said second pair of lugs.

8. A mounting plate comprising the assembly according to claim 1.

9. A motor vehicle comprising the assembly according to claim 1.

10. The assembly according to claim 1, wherein said illuminating part is applied against the entire bottom of said through opening.

11. The assembly according to claim 1, wherein said support plate has a hole extending around said through opening.

12. The assembly according to claim 11, wherein said hole has a general rectangular shape.

13. The assembly according to claim 1, wherein said support plate comprises side guide walls.

14. The assembly according to claim 13, wherein said support plate comprises a plurality of side guide walls, at least one side guide wall having at least one lateral support.

15. A method of assembling an assembly according to claim 1, said method comprising:
  applying an adhesive material to at least one of said support plate and said inner face of the interior glass sheet;
  depositing said support plate on said inner face;
  assembling said light emitting module to said support plate by means of the spring element such that at least one of said base is positioned against an inner face of said interior glass sheet and said illuminating part is positioned against a bottom of said through opening by simultaneously pressing said spring element on said light emitting module and under said lugs.

16. The method according to claim 15, further comprising marking said inner face of said interior glass sheet before applying the adhesive material.

17. The assembly according to claim 1, further comprising means for blocking light leaking through the interior glass sheet.

18. The assembly according to claim 17, wherein said means for blocking light is at least one diffusion-barrier plate provided adjacent to said support plate and against said inner face of the interior glass sheet.

19. The assembly according to claim 18, wherein said diffusion-barrier plate is integral with said support plate.

* * * * *